(12) United States Patent
Iwasaki et al.

(10) Patent No.: US 7,582,249 B2
(45) Date of Patent: Sep. 1, 2009

(54) METHOD OF MANUFACTURING THERMOPLASTIC RESIN CONTAINER

(75) Inventors: Tsutomu Iwasaki, Yokohama (JP);
Masahito Kogure, Yokohama (JP);
Hideo Kawasaki, Yokohama (JP);
Yasushi Hatano, Yokohama (JP)

(73) Assignee: Toyo Seikan Kaisha Ltd., Tokyo (JP)

( * ) Notice: Subject to any disclaimer, the term of this patent is extended or adjusted under 35 U.S.C. 154(b) by 579 days.

(21) Appl. No.: 10/521,594

(22) PCT Filed: Jul. 16, 2003

(86) PCT No.: PCT/JP03/09005

§ 371 (c)(1),
(2), (4) Date: Jan. 18, 2005

(87) PCT Pub. No.: WO2004/009332

PCT Pub. Date: Jan. 29, 2004

(65) Prior Publication Data

US 2006/0151924 A1    Jul. 13, 2006

(30) Foreign Application Priority Data

Jul. 19, 2002    (JP) ............................. 2002-211660

(51) Int. Cl.
*B29C 51/10* (2006.01)
(52) U.S. Cl. ..................... 264/549; 264/550; 264/572; 264/554; 425/388
(58) Field of Classification Search ........................ None
See application file for complete search history.

(56) References Cited

U.S. PATENT DOCUMENTS

| | | | | |
|---|---|---|---|---|
| 2,973,558 A | * | 3/1961 | Stratton, Jr. ................. | 264/549 |
| 2,990,581 A | * | 7/1961 | Rowe, Jr ..................... | 264/549 |
| 3,338,997 A | * | 8/1967 | Tigner ........................ | 264/549 |
| 3,342,914 A | * | 9/1967 | Edwards ..................... | 264/549 |
| 3,465,071 A | | 9/1969 | Edwards | |
| 3,739,052 A | * | 6/1973 | Ayres et al. ................. | 264/512 |
| 4,239,727 A | * | 12/1980 | Myers et al. ................ | 264/550 |
| 4,388,356 A | * | 6/1983 | Hrivnak et al. ........... | 428/36.92 |
| 4,563,325 A | * | 1/1986 | Coffman ..................... | 264/550 |
| 4,668,175 A | * | 5/1987 | Martin ........................ | 425/388 |
| 4,883,633 A | * | 11/1989 | French ........................ | 264/550 |
| 5,188,787 A | * | 2/1993 | King et al. .................. | 264/153 |
| 5,198,175 A | * | 3/1993 | Kato et al. .................. | 264/512 |
| 5,641,524 A | * | 6/1997 | Rush et al. .................. | 425/384 |

FOREIGN PATENT DOCUMENTS

EP    0 344 331    12/1989

(Continued)

*Primary Examiner*—Edmund H. Lee
(74) *Attorney, Agent, or Firm*—Manabu Kanesaka (57) ABSTRACT

In a method for manufacturing a thermoplastic resin vessel, in which a cup-shaped vessel is thermally formed from a thermoplastic resin sheet by a plug, the method including the steps of: pre-forming a portion of the thermoplastic resin sheet corresponding to an orifice portion or a flange portion of the cup-shaped vessel; and clamping the pre-formed portion of the thermoplastic resin sheet to accomplish the forming. According to the manufacturing method, thickening of a vessel bottom part and warpage of the flange portion can be improved.

3 Claims, 11 Drawing Sheets

FOREIGN PATENT DOCUMENTS

| | | |
|---|---|---|
| EP | 1 213 125 | 6/2002 |
| JP | 43-32236 | 12/1968 |
| JP | 50-71576 | 11/1973 |
| JP | 58-89319 | 5/1983 |
| JP | 59-23536 | 6/1984 |
| JP | 04-14430 | 1/1992 |
| JP | 04-301429 | 10/1992 |
| JP | 2001-139014 | 5/2001 |

* cited by examiner

METHOD OF MANUFACTURING THERMOPLASTIC RESIN CONTAINER

RELATED APPLICATIONS

The present application is based on, and claims priority from, Japanese Application Number 2002-211660, filed Jul. 19, 2002, the disclosure of which is hereby incorporated by reference herein in its entirety.

TECHNICAL FIELD

The present invention relates to a method for manufacturing a vessel obtained by thermally forming a sheet of a thermoplastic resin, particularly to a method for manufacturing a vessel, in which a vessel bottom part is thickened, and generation of warpage in a flange portion is prevented.

BACKGROUND ART

Since vessels formed of thermoplastic resins are superior in shock resistance, and are easily handled, increases of demands are expected from now on. Especially, thermoplastic polyester such as polyethylene terephthalate is superior in transparency in addition to the shock resistance, has a gas barrier property, and has therefore been broadly used in various vessels.

As one example of the thermoplastic resin vessel, there has been a flanged vessel constituted by thermally forming a drawn or non-drawn sheet of a thermoplastic resin.

As a method for manufacturing this type of vessel, for example, there has been a method in which a sheet of softened polyethylene terephthalate is deep-drawn and brought into contact with the interior of a female mold heated at a glass transition point or a higher temperature using a male plug, heat-set, thereafter shrunk back on a male plug, and cooled to manufacture the vessel (Japanese Patent Application Laid-Open No. 58-89319).

According to this forming method, the sheet of polyethylene terephthalate can be drawn to thereby impart transparency, or heat-set to thereby enhance heat resistance.

However, in this manufacturing method, since the bottom part of the vessel is excessively drawn, the bottom part and its vicinity are thinned, and there is a problem that shaping becomes difficult especially in manufacturing a deeply drawn vessel.

Moreover, there is also a problem that a flange portion of the manufactured vessel warps in an upward direction.

An object of the present invention is to provide a method for manufacturing a thermoplastic resin vessel in which thickening of a vessel bottom part and warpage of the flange portion have been improved in consideration of the above-described problem.

To solve the problem, as a result of intensive researches, the present inventors have found that in a step of forming a thermoplastic resin sheet into a vessel by a plug, first the thermoplastic resin sheet is pre-formed by the plug, a pre-formed portion of the thermoplastic resin sheet is next clamped, thereafter the plug is inserted into the sheet to a stroke end to thereby form (draw) a vessel main body, and accordingly the thickening of the vessel bottom part and the warpage of the flange portion are improved, and the present invention has been completed.

DISCLOSURE OF THE INVENTION

According to the present invention, there is provided a method for manufacturing a thermoplastic resin vessel, in which a cup-shaped vessel is thermally formed from a thermoplastic resin sheet by a plug, the method comprising the steps of: pre-forming the thermoplastic resin sheet by the plug; and next clamping the pre-formed portion of the thermoplastic resin sheet to accomplish the forming.

Moreover, the step of clamping the portion may be performed while the pre-forming continues to the forming (the forming which does not involve stopping of the plug), or may be performed after the pre-forming ends (once stopping the plug).

Furthermore, the resin sheet may not be drawn by the pre-forming, but a portion corresponding to an orifice portion or a flange portion of the vessel in the resin sheet is more preferably drawn by the pre-forming.

When the portion corresponding to the vessel orifice portion is pre-formed in this manner, the orifice portion is oriented/crystallized, and the warpage after the forming can be improved. When the portion corresponding to the vessel orifice portion is drawn before forming the vessel main body, the resin can be drawn into the vessel from a portion that has heretofore been treated as a skeleton. Therefore, the bottom part of the vessel can be thickened.

It is to be noted that in the present description, the orifice portion means the orifice portion and its periphery.

The manufacturing method of the present invention is suitable especially for the manufacturing of a flanged cup-shaped vessel. That is, according to the present invention, there is provided a method for manufacturing a thermoplastic resin vessel, in which a flanged cup-shaped vessel is thermally formed from a thermoplastic resin sheet by a plug, the method comprising the steps of: pre-forming a portion corresponding to the flange portion to thereby draw a resin from the portion corresponding to the flange portion and/or its outer periphery; clamping the drawn portion of the thermoplastic resin sheet after the pre-forming; extruding a part of the resin in the portion corresponding to the flange portion in flange inner and outer peripheral directions; and forming the flange portion.

Accordingly, the flange portion is oriented/crystallized, and the warpage after the forming can be improved. When the portion corresponding to the flange portion is pre-formed and drawn before forming a vessel main body, the resin can be drawn into a vessel side from a portion that has heretofore been treated as a skeleton, and the bottom part of the vessel can be thickened. Furthermore, when the flange portion is formed, the resin flows into a flange portion interior (inner peripheral direction) and a flange portion exterior (outer peripheral direction) from a portion corresponding to the flange portion of the clamped sheet. Therefore, flow orientation occurs in the clamped flange portion, orientation crystallization is promoted, and therefore the warpage after the forming can be improved.

It is to be noted that in the present description, the flange portion means the flange portion including its periphery.

Moreover, in the present invention, the pre-forming by the plug preferably has a step (hereinafter referred to as a pre-clamping step) of fixing an outer periphery of a portion to be formed, that is, the outer periphery of the portion corresponding to the orifice portion or the flange portion of the vessel.

Figure 11:
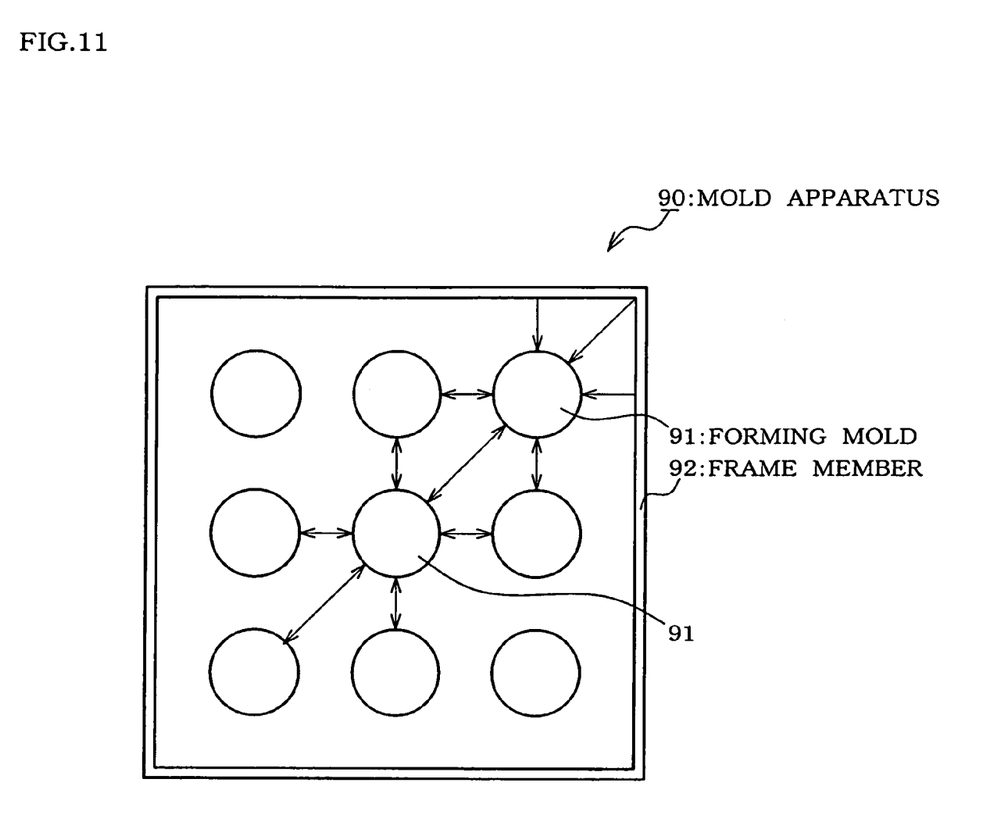
FIG. 11 is a plan view showing a positional relation of a plug in a case where a large number of vessels are manufactured.

For example, to simultaneously form a large number of vessels from one sheet, as shown in FIG. 11, a mold apparatus 90 is used in which a large number of forming molds 91 are arranged adjacent to one another. In this case, at the time of the forming, a resin sheet is taken among the adjacent molds. As to a certain mold, an interval between the mold and the peripheral mold 91 or a frame member 92 differs, and a resin amount between them also differs. Therefore, there is a problem that a difference is made in a drawn-in amount of the resin, and a thickness of the vessel fluctuates between the vessels and in the vessel itself.

From this viewpoint, according to the present invention, there is provided a method for manufacturing a thermoplastic resin vessel, comprising: a step of pre-clamping an outer periphery of a pre-formed portion, that is, the outer periphery of the portion corresponding to an orifice portion or a flange portion.

When the method has this pre-clamping step, the resin sheet can be prevented from being taken among the molds. The difference of the drawn-in resin amount, attributed to the arrangement of the molds, can be solved, and a thickness, weight and the like of the vessel can be uniformed.

Moreover, conversely, when an arbitrary difference is disposed in the interval between the mold and a pre-clamp, it is possible to partially control the thickness of the vessel.

Furthermore, in the present invention, lubricants such as silicone oil, palm oil, and vegetable oils including Grammar wax are preferably applied to at least a portion of the thermoplastic resin sheet corresponding to the flange portion. The lubricant may be applied only to an outer surface in a case where an influence onto a content is to be reduced.

In this case, damages on a side wall outer surface, generated immediately under a flange due to friction between a lower mold and the sheet, are reduced, when the sheet is clamped in order to form the flange portion. The clamped portion is crushed, and a part of the resin is pushed out of the portion, and easily flows inside and outside the flange portion. Therefore, the flow orientation of the resin in the clamped flange portion is remarkable, the orientation crystallization is promoted, and the flange portion can be prevented from being warped.

Moreover, in the present invention, the thermoplastic resin sheet is preferably formed of a thermoplastic polyester resin. The thermoplastic resin sheet may comprise a single layer of the thermoplastic polyester resin, or a multiple layers with other resins including a polyester resin.

In this case, the thermoplastic polyester resin is oriented/crystallized, and thermally crystallized through a drawing step and a thermal fixing (heat-setting) step, and accordingly mechanical strength, transparency, and heat resistance are enhanced.

Moreover, in the present invention, thermal forming is preferably a forming method comprising the steps of: pneumatically forming and thermally fixing the thermoplastic resin sheet into a shape of a lower mold heated at a temperature which is not less than a crystallization temperature of the thermoplastic resin sheet; thereafter decompressing the inside of a formed article to contract the formed article; and imparting and cooling a shape of the plug which is a final vessel shape.

In this case, the mechanical strength, transparency, and heat resistance of the thermoplastic polyester resin are enhanced.

Moreover, in the present invention, the cup-shaped vessel is preferably formed in such a manner that H/D (height/orifice portion inner diameter) is 1.3 to 2.1.

In the present invention, the resin of the portion which has not heretofore been used in the vessel can be used, and therefore the vessel bottom part can be thickened. However, when the ratio is smaller than 1.3, there is a possibility that the resin is insufficiently drawn, the orientation crystallization is not performed, and the transparency of the vessel drops. When the ratio is greater than 2.1, the shaping becomes difficult.

Especially, the ratio is preferably 1.3 to 1.8. That is, the present invention is suitable for manufacturing a deep drawn vessel.

Moreover, in the present invention, an area drawing magnification of the vessel bottom part is preferably set to 3.5 to 10 times. Especially, 3.5 to 9 times are preferable.

Additionally, when the magnification is less than 3.5 times, the orientation drawing becomes insufficient, the transparency drops, and the vessel is brittle. When the magnification exceeds ten times, there is a possibility that the strength drops because of the thinning, the resin hardens because of excessive orientation crystallization, and the shaping becomes difficult.

BEST MODE FOR CARRYING OUR THE INVENTION

One embodiment of a manufacturing method of the present invention will be described hereinafter.

It is to be noted that the present invention is not limited to this embodiment.

FIGS. 1 to 10 are figures showing an embodiment in which the manufacturing method of the present invention is applied to a solid phase forming method.

Figure 1:
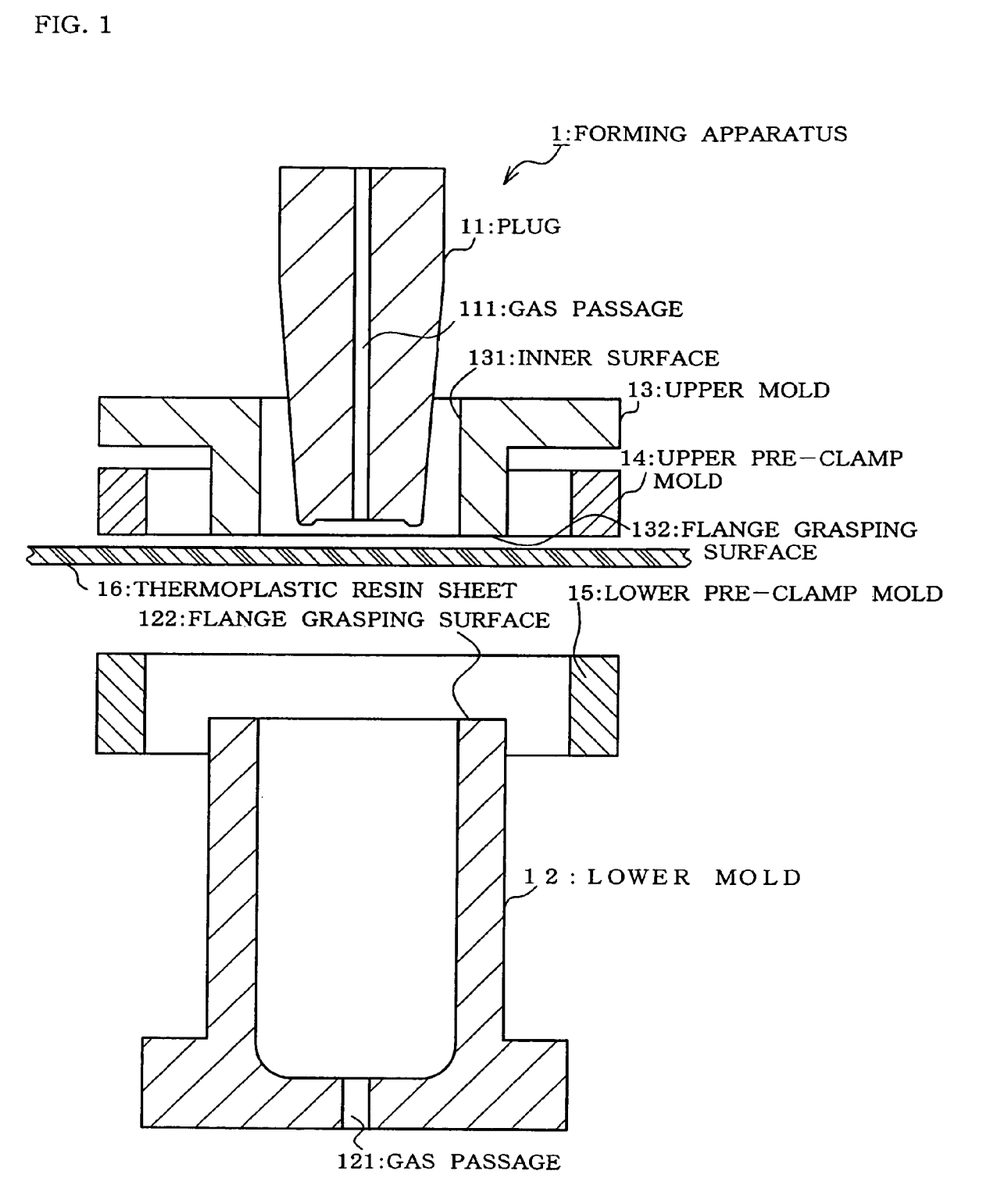
FIG. 1 is a side sectional view of a forming apparatus for carrying out a manufacturing method of the present invention.

FIG. 1 is a schematic side sectional view of a solid-phase forming apparatus example for carrying out the manufacturing method of the present invention.

A forming apparatus 1 mainly comprises a plug 11, a lower mold 12, an upper mold 13, an upper pre-clamp mold 14, and a lower pre-clamp mold 15.

The plug 11 is disposed for drawing/forming a thermoplastic resin sheet 16, and has a shape of a final formed article for contracting/shaping a drawn/heat-set (thermally fixed) sheet. In the plug 11, a gas passage 111 for compression and decompression is disposed in an axial direction.

The lower mold 12 is disposed for heat-setting the sheet detached from the plug. On an upper end face of the lower mold 12, a flange grasping surface 122 which forms a flange portion in cooperation with the upper mold 13 is disposed. A gas passage 121 for discharging and supplying a gas is formed in a central portion of the lower mold 12.

The lower mold 12 is disposed coaxially with the plug 11, and the plug 11 and the lower mold 12 are relatively movable in the axial direction in such a manner that the plug 11 is inserted into and detached from the lower mold 12.

The upper mold 13 cooperates with the lower mold 12 to form the flange portion (orifice portion), and constitutes a short hollow cylindrical article. Therefore, the upper mold 13 has an inner surface 131 having a diameter substantially equal to that of a cylindrical inner surface of the lower mold 12, and a grasping surface 132 having the same shape as that of the flange grasping surface 122 of the lower mold 12 is disposed on a lower end face of the upper mold. It is to be noted that these flange grasping surfaces of the upper/lower molds may be flat surfaces, and concave/convex portions may be disposed in one or both of the molds if necessary.

The upper pre-clamp mold 14 and the lower pre-clamp mold 15 are coaxially disposed on outer peripheries of the upper mold 13 and the lower mold 12, and cooperate with each other to fix the thermoplastic resin sheet. The lower pre-clamp mold 15 operates independent of the plug 11 and the lower mold 12.

Next, a method for manufacturing a vessel according to the present embodiment will be concretely described.

As shown in FIG. 1, four sides or two sides of the sheet 16 are clamped (not shown), and the sheet is fixed between the upper mold 13 or the like and the lower mold 12 or the like.

A temperature of the sheet at this time depends on a resin for use, and is set to a glass transition point (Tg) to (Tg+45)° C. in the sheet of a polyester resin. When the temperature of the sheet is higher than (Tg+45)° C., orientation crystallization does not sufficiently occur, and there is a possibility that a whitening phenomenon occurs by thermal crystallization in a subsequent heat setting step. When the temperature is lower than Tg° C., a high forming force is required, additionally the forming itself is difficult, and there is a possibility that the resin has an excessively drawn state at the time of the forming, and the whitening phenomenon occurs.

Figure 2:
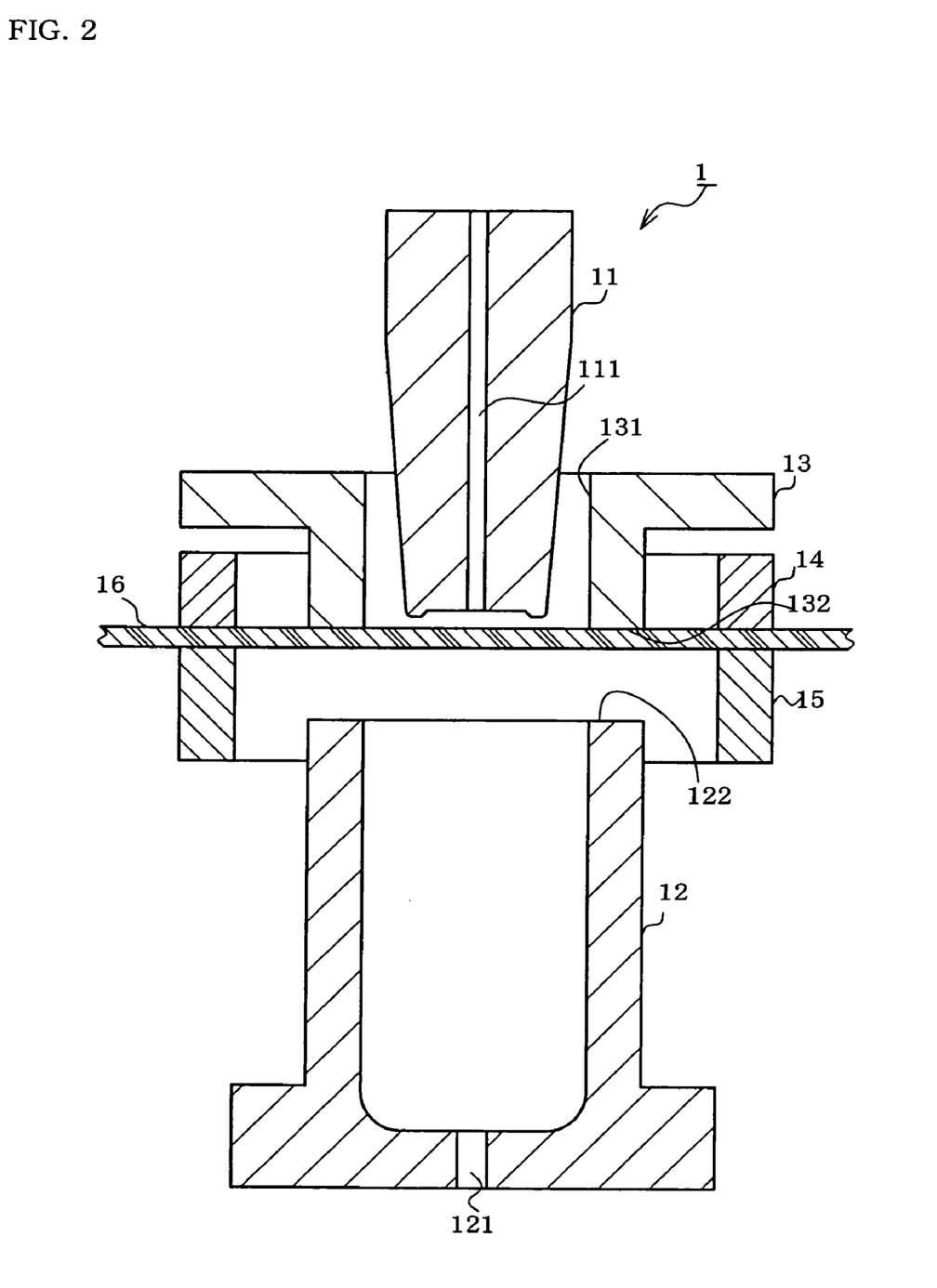
FIG. 2 is a side sectional view at a time when a thermoplastic resin sheet is fixed (pre-clamped)

FIG. 2 is a side sectional view at a time when the thermoplastic resin sheet 16 is pre-clamped by the upper pre-clamp mold 14 and the lower pre-clamp mold 15.

When the sheet is clamped around the forming mold, a relation between the inside (pre-clamp area) and the outside of the clamped portion of the sheet can be severed. Therefore, when a large number of vessels are formed from one sheet at once, so-called multiple manufacturing is performed, an influence of another clamp area and an influence of an interval between the molds are not exerted. Accordingly, even when a large number of vessels are formed, the vessels having a uniform quality (thickness, weight, etc.) can be manufactured.

It is to be noted that even in a case where one vessel is manufactured (one vessel taking) from one sheet, as described above the sheet 16 is usually clamped by four or two sides by a frame. Therefore, when the sheet having an influenced size is used, the pre-clamping is preferably performed. However, when a sheet sufficiently larger than the vessel to be formed is used, the pre-clamping step may be omitted.

The temperature of the pre-clamp mold is preferably not more than a softening point or a melting point of the sheet resin, and the cooling may be performed if necessary. When the pre-clamp mold is cooled, vessel deformation caused by thermal deformation of the sheet can be inhibited at a time when the sheet solidifies after a mold releasing step.

As the temperature of the pre-clamp mold, for example, when the sheet is obtained substantially as an amorphous or low-crystalline sheet as in the polyester resin, the pre-clamp mold is preferably cooled at not more than the glass transition temperature of the resin. On the other hand, when the sheet is substantially crystallized and obtained as in polypropylene, the pre-clamp mold is preferably cooled at not more than a softening point of the resin.

Here, the grasping surface of the pre-clamp may have a flat surface, crest cut shape, or concave/convex rib shape. When the rib shape is disposed, rigidity can be imparted to the sheet after punching, and an effect similar to that obtained when the pre-clamp mold is cooled is obtained.

Figure 3:
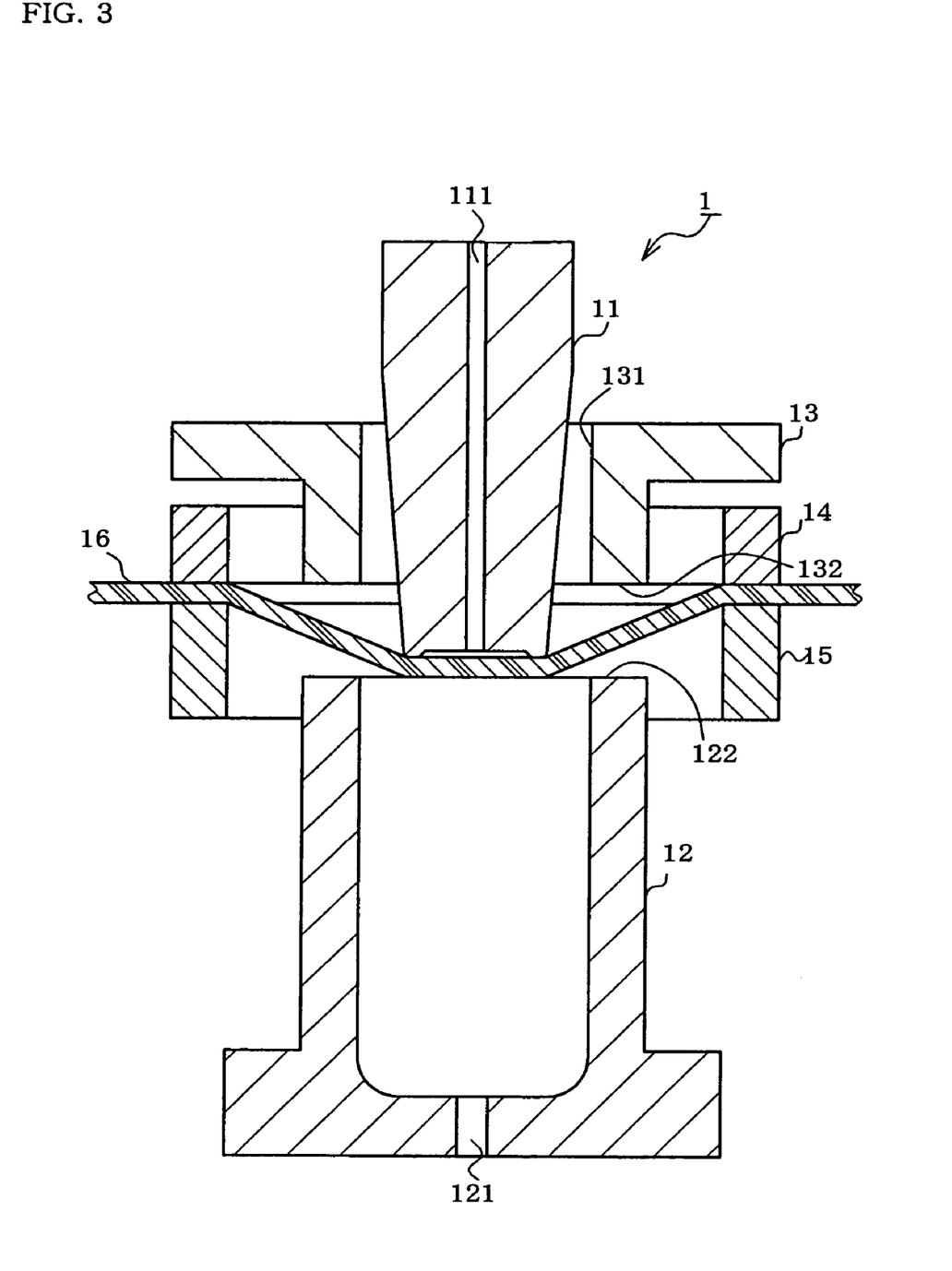
FIG. 3 is a side sectional view showing a pre-forming step.

FIG. 3 is a side sectional view showing a step (pre-forming step) of drawing a portion corresponding to a vessel orifice portion or flange portion to thereby draw the resin from the outer periphery of the orifice portion.

The sheet 16 is pushed downwards by a predetermined amount by the plug 11. Accordingly, a portion forming a flange portion (orifice portion) is drawn in a subsequent step. Therefore, since the flange portion is oriented/crystallized, warpage after the shaping can be prevented.

Moreover, by the drawing, the resin is drawn into an area (forming area) inside the orifice portion or the flange portion from the outer periphery of the portion forming the vessel orifice portion or flange portion. Accordingly, the resin of the outer peripheral portion of the vessel orifice portion or the flange portion, which has not heretofore been used in the vessel, can be effectively used, and the thickness of the bottom part of the vessel can be increased.

The temperature of the plug 11 at this time is 70° C. to 110° C., preferably 80° C. to 100° C., for example, in the case of a polyester resin sheet.

Moreover, a push-in amount (pre-forming amount) of the plug 11 is appropriately adjusted in consideration of the shape (thickness, height, bottom area, etc.) of the vessel to be manufactured, a pre-clamped area, the thickness of the resin sheet, and the like.

When a preceding amount is short, the drawing becomes insufficient, the improvement of the warpage of the flange portion is not achieved, further the drawn-in resin is running short, and there is a possibility that the bottom part of the vessel to be manufactured cannot be thickened.

On the other hand, when the pre-forming amount is excessively large, the drawn-in amount of the resin is excessively large, and the whole vessel, particularly the resin of the vessel bottom part cannot be subjected to sufficient drawing. As a result, the formed vessel has a possibility that sufficient orientation crystallization cannot be achieved, and the bottom part is whitened.

Figure 4:
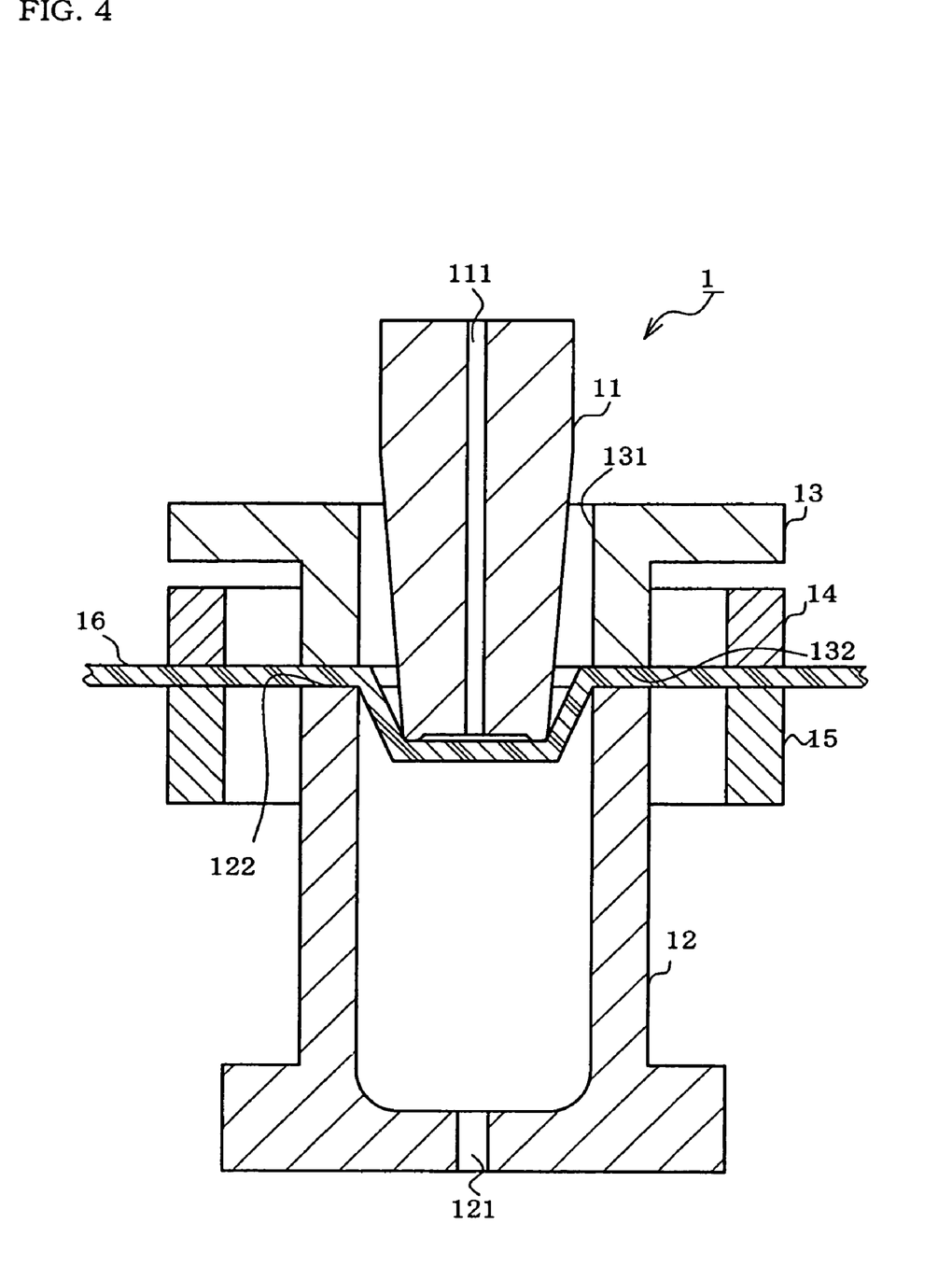
FIG. 4 is a side sectional view showing a step of clamping a drawn portion of the thermoplastic resin sheet to accomplish forming.

FIG. 4 is a side sectional view showing a step of clamping a drawn portion of the thermoplastic resin sheet to accomplish forming.

In this step, the lower mold 12 rises, and accordingly cooperates with the upper mold 13, and the flange portion (orifice portion) is clamped and formed by the respective grasping surfaces 122, 132. The flange portion is clamped by the upper mold 13 and the lower mold 12, and accordingly flows and is oriented. At this time, when at least the portion of the thermoplastic resin sheet corresponding to the flange portion is coated with lubricants such as silicone oil, palm oil, and vegetable oils including Grammar wax, satisfactory slippage is achieved between an inner corner of the grasping surface 122 and the sheet, and damages on the side wall outer surface generated immediately under the flange are reduced. The clamped portion is crushed, a part of the resin is pushed out of the portion, and easily flows to the inside and outside of the flange portion, flow orientation of the resin in the clamped flange portion becomes remarkable, the orientation crystallization is promoted, and the warpage of the flange portion is further improved.

At this time, the temperature of the upper mold is preferably room temperature to 150° C., especially preferably 50° C. to 130° C. in the case of the polyester resin sheet.

Figure 5:
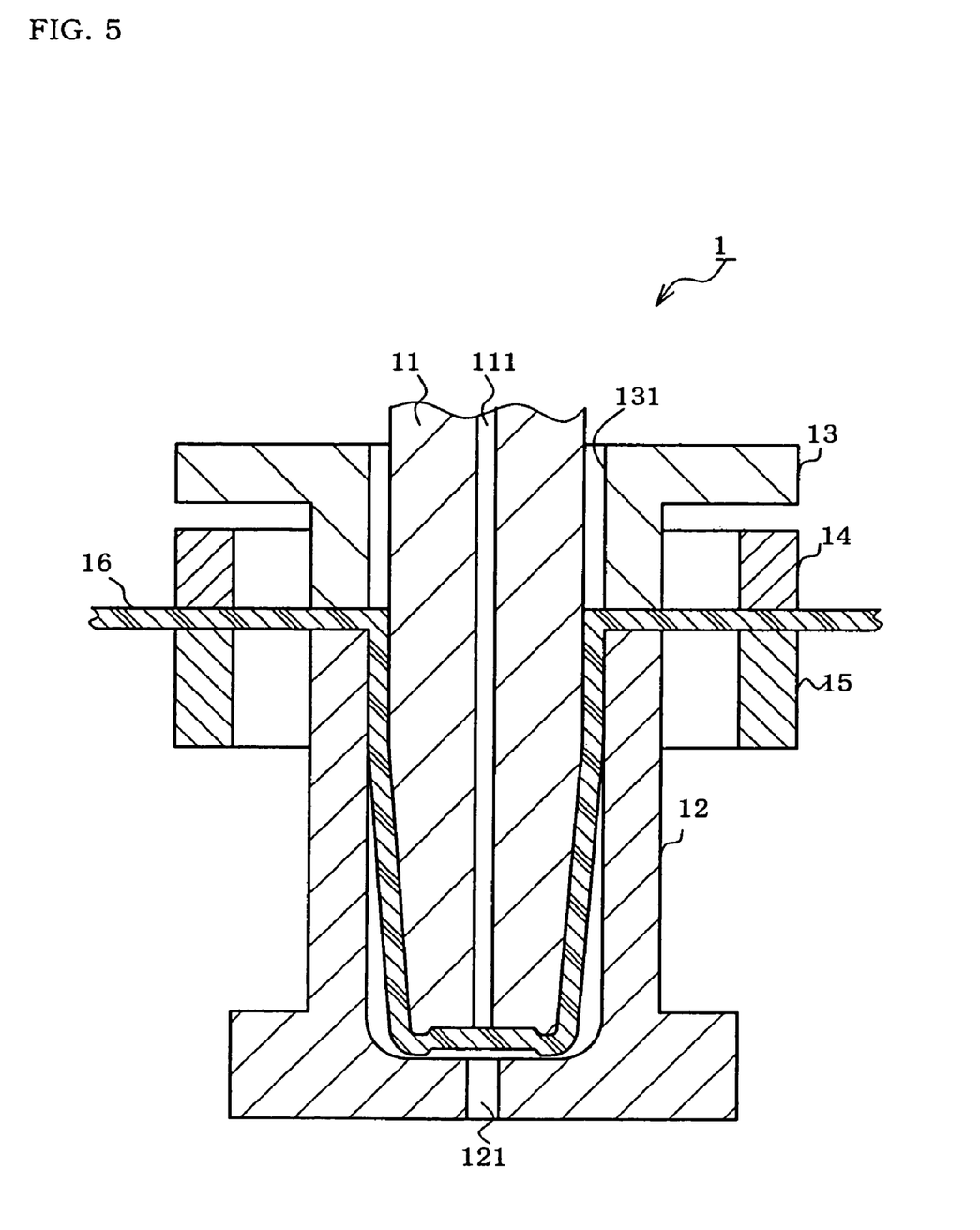
FIG. 5 is a side sectional view showing a drawing step.

FIG. 5 is a side sectional view showing a drawing step for forming a vessel main body.

In this step, the plug 11 is inserted into the lower mold 12 to the stroke end, and accordingly the sheet 16 is drawn, oriented, and crystallized.

Figure 6:
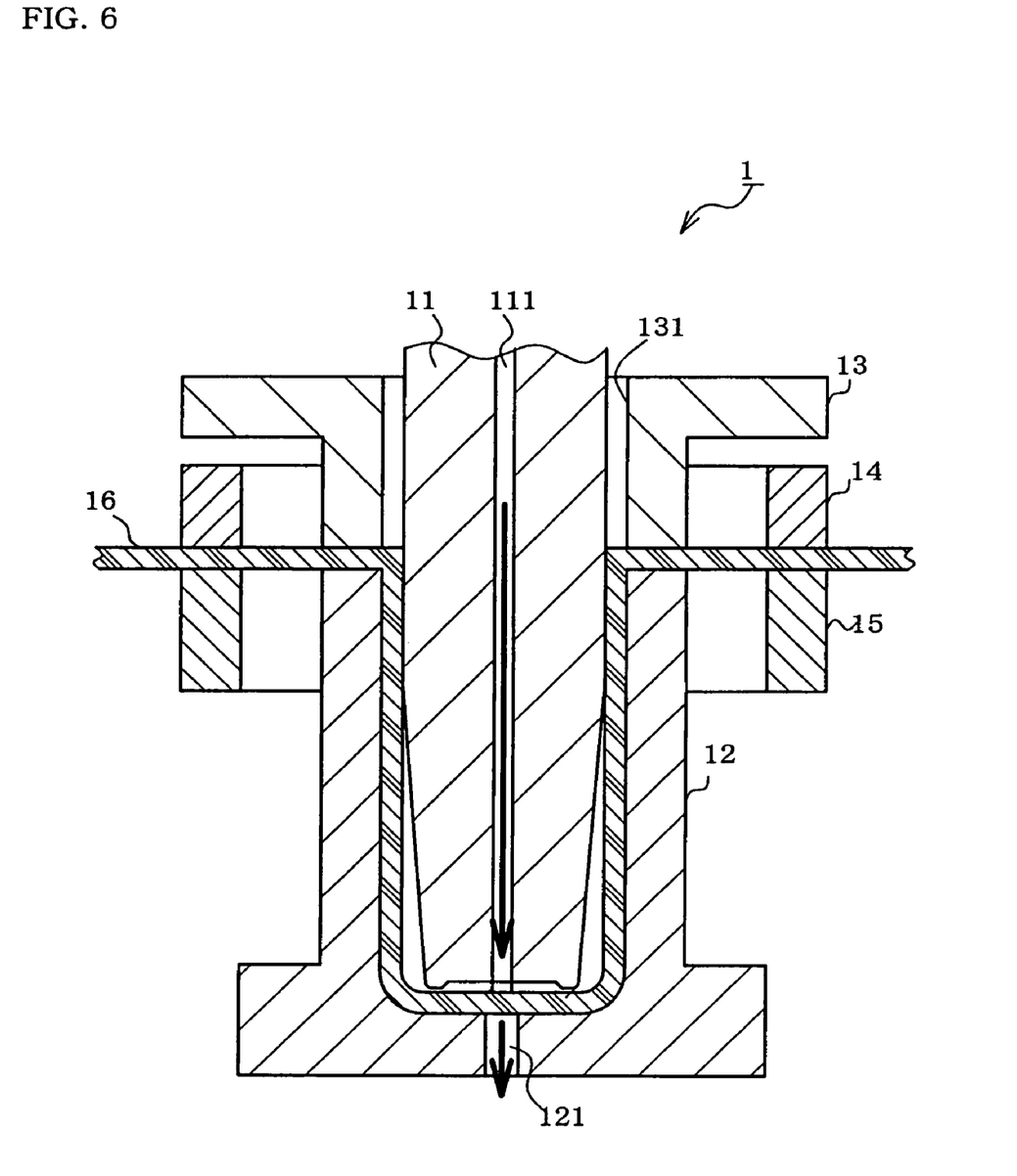
FIG. 6 is a side sectional view showing a heat setting step.

FIG. 6 is a side sectional view showing a heat setting step.

In this step, compressed air is supplied (pneumatically) via the gas passage 111 of the plug 11, and the sheet 16 is brought into contact with the inner surface of the lower mold 12. At this time, the lower mold 12 is heated beforehand, and heat is applied to the sheet to thereby heat-set the sheet. Furthermore, at this time, air may be sucked from the gas passage 121 of the lower mold 12. In this case, the sheet satisfactorily closely contacts the lower mold 12, and it is possible to effectively heat-set the sheet.

The temperature of the lower mold 12 at a heat-setting time is preferably 120° C. to 200° C., especially preferably 140° C. to 180° C. in the case of the polyester resin sheet.

It is to be noted that in a case where the heat-setting is not performed, the mold temperature is set to be not more than the glass transition temperature, the cooling/shaping is performed in a state in which the sheet is brought into close contact with the mold, and a final vessel may be taken out.

Figure 7:
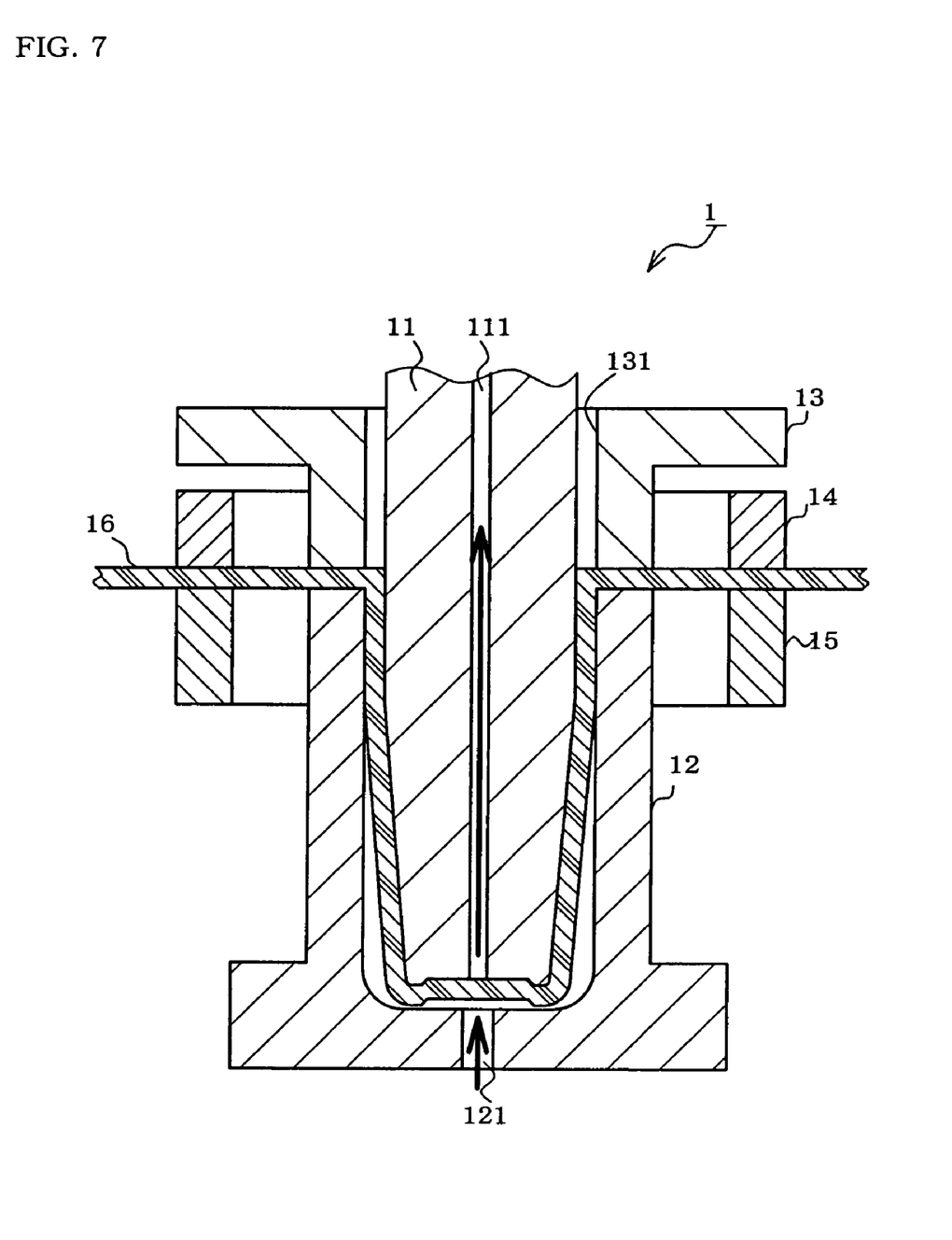
FIG. 7 is a side sectional view showing a cooling/shaping step.

FIG. 7 is a side sectional view showing a cooling/shaping step.

In this step, the compressed air supplied from the passage 111 of the plug 11 is stopped, and the sheet is self-shrunk. Moreover, the air is sucked via the gas passage 111, vacuum is drawn between the sheet and the plug, and the sheet is formed into the shape of the outer surface of the plug 11. At this time the compressed air may be supplied from the gas passage 121 of the lower mold 12. In this case, adhesion is improved, and shaping property is enhanced.

Figure 8:
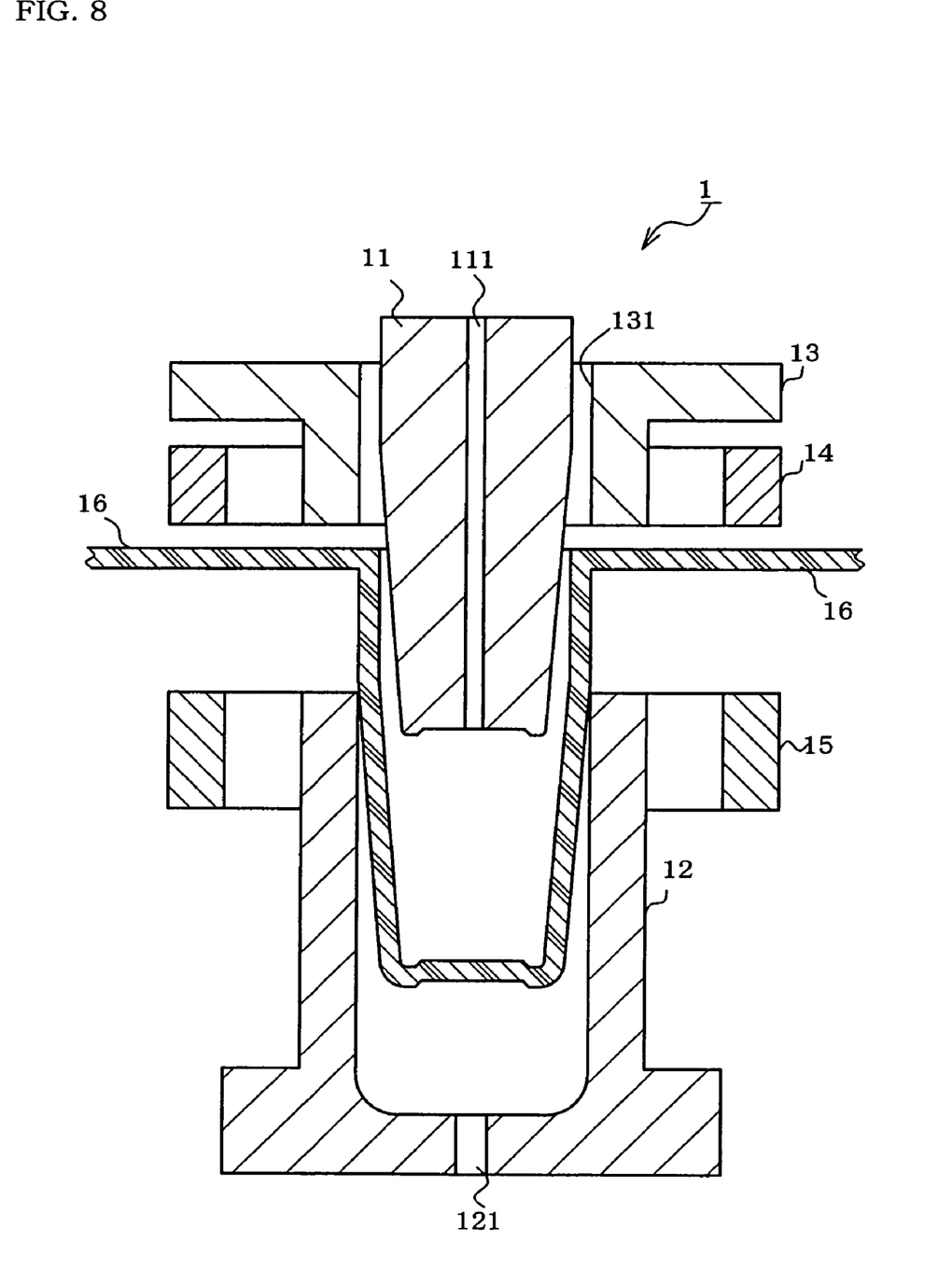
FIG. 8 is a side sectional view showing a mold releasing step.

FIG. 8 is a side sectional view showing a mold releasing step.

In this step, the mold and the pre-clamp mold are opened, the plug 11 is raised, and the final formed article is taken out.

Figure 9:
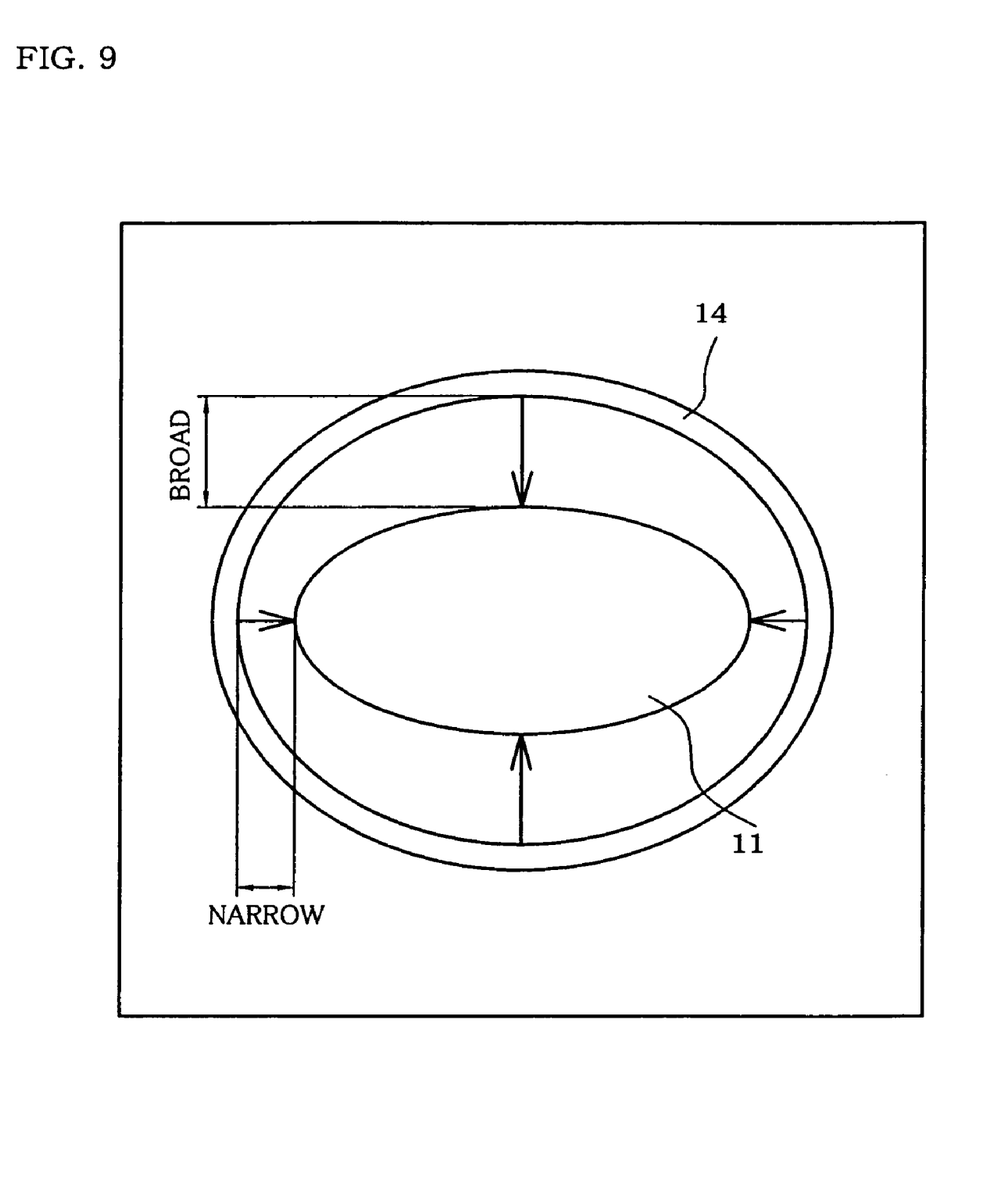
FIG. 9 is a plan view of the forming apparatus at a time when a vessel having an oval sectional shape is manufactured.

The method for manufacturing of the vessel of the present invention can be also preferably applied to a case where a vessel having an oval planar sectional shape as shown in FIG. 9 or a vessel having a square planar sectional shape is manufactured.

Figure 10:
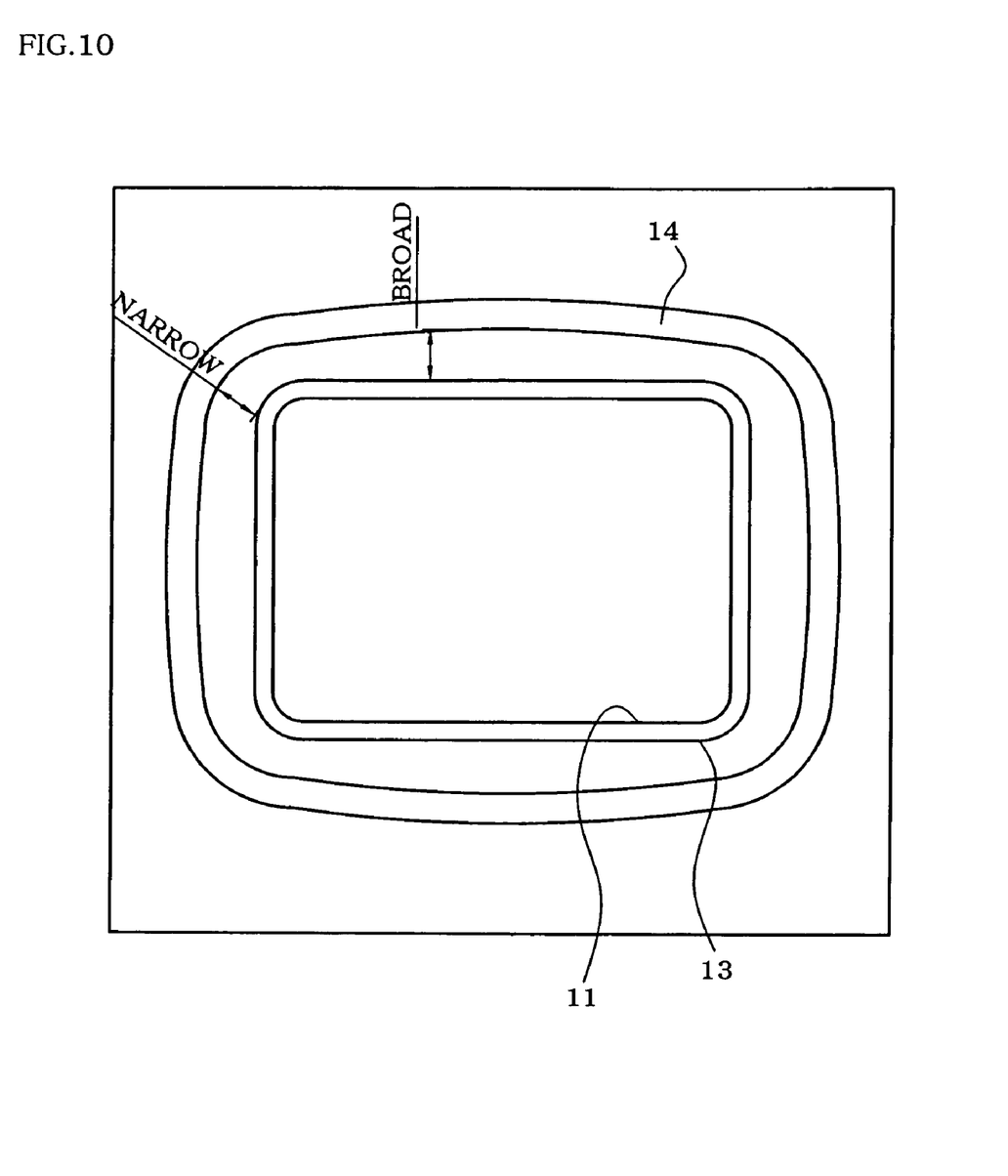
FIG. 10 is a plan view of the forming apparatus at a time when a vessel having a square sectional shape is manufactured.

FIG. 9 is a plan view of a forming apparatus at a time when the vessel having the oval sectional shape is manufactured, and FIG. 10 is a plan view of the forming apparatus at a time when the vessel having the square sectional shape is manufactured.

That is, when the shape of the pre-clamping area is adjusted in the pre-clamping step, a thickness distribution of the vessel is controlled.

For example, to manufacture the vessel whose planar section has a round shape, as described above, the pre-clamping area needs to be formed into a shape analogous to that of a flange inner end of the cup-shaped vessel, when the thickness, weight or the like of the vessel is uniformed.

On the other hand, to manufacture the vessel whose planar section has an oval shape, a large amount of resin is drawn into a portion having a large curvature in which the thickness of the vessel is easily reduced. Therefore, an interval between the flange inner end of the cup-shaped vessel and the pre-clamping area is increased so that the thickness distribution control is possible.

Moreover, to manufacture a vessel whose side portion is easily thinned and whose planar section has a square shape, as shown in FIG. 10, an interval between a straight line portion of the flange inner end of the cup-shaped vessel and the pre-clamping area is increased so that the thickness distribution control is possible.

It is to be noted that in the vessel whose flat surface has a square shape, the interval between the flange inner end of the cup-shaped vessel and the pre-clamping area in a long side portion is set to be larger than that in a short side portion.

Furthermore, when the sheet indicates a dynamic anisotropy by molecular orientation or the like, this is considered in adjusting the pre-clamping area so that the control of the thickness distribution is possible.

The method for manufacturing the vessel of the present invention is applicable to either sheets formed of crystalline resins including polyolefin-based resins such as polyethylene, polypropylene, and polystyrene or polyamide-based resins such as polyamide 6, polyamide 66, and polyamide 46, or sheets formed of amorphous resins including polyester-based resins such as polyethylene terephthalate (PET) and polybutylene terephthalate, polycarbonate, polyarylate, and annular olefin-based copolymer. These sheets may be not only single-layer sheet but also sheets having a plurality of layers.

Concretely, a sheet of a polyester-based resin having at least one polyester layer is preferably used.

Examples of polyester for use include: polyester derived from a carboxylic acid component mainly composed of aromatic dicarboxylic acid and an alcohol component mainly composed of fatty diol; and preferably polyester in which 50 mol % or more of the carboxylic acid component comprises a terephthalic acid component and 50 mol % or more of the alcohol component comprises a ethylene glycol component.

Polyester may be homo-polyester, copolymer polyester, or a blend of two or more types of them as long as this condition is satisfied.

Examples of the carboxylic acid component other than the terephthalic acid include isophthal acid, naphthalene dicarboxylic acid, P-β-oxyethoxy benzoic acid, biphenyl-4,4'-dicarboxylic acid, diphenoxyethane-4,4'-dicarboxylic acid, 5-sodium sulfoisophthalic acid, hexahydroterephthalic acid, adipic acid, sebacic acid, trimellitic acid, pyromellitic acid and the like.

On the other hand, examples of the alcohol components other than ethylene glycol include alcohol components such as 1,4-butanediol, propylene glycol, neopentyl glycol, 1,6-hexylene glycol, diethylene glycol, triethylene glycol, cyclohexane dimethanol, ethylene oxide addition product of bisphenol A, glycerol, trimethyrol propane, pentaerythritol, dipentaerythritol, and sorbitan.

As to examples of preferable thermoplastic polyester, for example, polyethylene terephthalate is most preferable, and the other examples include polyethylene/butylene terephthalate, polyethylene terephthalate/2,6-naphthalate, polyethylene terephthalate/isophthalate, these components and polybutylene terephthalate, polybutylene terephthalate/isophthalate, polyethylene-2,6-naphthalate, polybutylene terephthalate/adipate, polyethylene-2,6-naphthalate/isophthalate, polybutylene terephthalate/adipate, a blend of two or more types of them and the like.

A molecular weight of polyester is preferably a molecular weight in a film forming range. Concretely, an inherent viscosity [IV] measured using a phenol/tetrachloroethane mixed solvent as a solvent is preferably 0.5 or more, especially in a range of 0.6 to 1.5 in formability, mechanical property, heat resistance and the like.

In polyester, at least one type of modified resin components may be contained such as ethylene-based polymer, thermoplastic elastomer, polyarylate, and polycarbonate. In general, the modified resin components are preferably used in the amount of 50 weight parts per 100 weight parts of polyester, especially preferably 5 to 35 weight parts.

Moreover, known compounding agents for plastic, such as antioxidant, heat stabilizer, ultraviolet absorber, charging preventive agent, filler, colorant and the like can be blended. For a purpose of setting a formed vessel to be opaque, fillers such as calcium carbonate, calcium silicate, alumina, silica, various clays, casting plaster, talc, and magnesia, or inorganic or organic pigments such as titanium white, yellow iron oxide, colcothar, ultramarine blue, and chromium oxide may be blended.

To impart various functions to the vessel to be manufactured, the thermoplastic resin sheet may have a gas barrier resin layer, a recycle polyester resin layer, oxygen absorbing resin layer and the like in addition to the polyester layer.

The other resin layer may be used as an inner or outer layer in a double-layer constitution, or as an intermediate layer in a three-layer constitution.

Moreover, the thickness of the thermoplastic resin sheet differs with a size or the like of the vessel, but a thickness of 0.5 to 5 mm, especially 1 to 3 mm is preferable in strength or formability of the vessel.

The vessel manufactured by the manufacturing method of the present invention has a thickened bottom part, and the vessel has a satisfactory self reliance or self stability. Since an area drawing magnification is also appropriate, transparency, shock resistance, and heat resistance are superior.

Furthermore, since the flange portion is oriented/crystallized, a shaping property is enhanced, and warpage is improved.

EXAMPLES

Examples of the present invention will be described hereinafter.

Example 1

A cup-shaped vessel was manufactured by a method described above in the embodiment. As a thermoplastic resin sheet, a sheet (manufactured by Mitsui Chemical Co., Ltd., trade name: SA135) of amorphous polyethylene terephthalate having a thickness of 1.2 mm and a glass transition temperature of 75° C. was used, and further the sheet surface was coated with silicone oil (manufactured by Shin-Etsu Silicone Co., Ltd., trade name: KM-871P).

The vessel was manufactured on the following forming conditions:

plug outermost diameter: 67 mm;
plug height: 108 mm;
flange grasping surface outer diameter: 75 mm;
pre-clamping grasping surface inner diameter: 94 mm:
pre-clamping grasping surface sectional shape: flat surface (width of 1 mm);
lower mold dimension: adjusted in such a manner that a clearance bet the lower mold and the plug was about 1 mm in each portion;
sheet temperature: about 95° C.;
plug temperature: about 90° C.;
upper mold temperature: about 130° C.;
lower mold temperature: about 160° C.;
upper/lower pre-clamp mold temperature: about 30° C.;
pneumatic condition in heat-setting step and shaping: 0.6 MPa;
insertion amount (pre-forming amount) of plug in first drawing: 23 mm;
shape of manufactured cup-shaped vessel: orifice portion inner diameter (D) 67 mm, height (H) of 108 mm, H/D=1.6, outer shape of flange portion 75 mm, and bottom part thickness of 0.28 mm; and
area drawing magnification of bottom part: 4.3 times.

Evaluation was performed as described later in order to confirm effects of the present invention. Results are shown in Table 1.

On the forming conditions, a satisfactory cup-shaped vessel was obtained whose bottom part was thickened and whose flange portion was not warped. By pre-clamping, eccentricity of a peripheral direction was not recognized in the vessel side wall or the like.

(Evaluation Items)

1. The thickness of the vessel bottom part was measured, and it was visually evaluated whether or not the vessel was formed substantially into a plug shape.

2. Transparency of the whole vessel, especially the bottom part was visually evaluated.

3. The warpage of the flange portion was visually confirmed, and flatness of such a level that heat-sealing was possible by a heat-seal lid was evaluated as satisfactory.

4. Outer appearances were evaluated such as presence of scratches and presence of resin reservoir with respect to the side wall right under the flange portion.

5. A cup was placed in an oven adjusted at a temperature of 100° C., left to stand for ten seconds after the surface temperature of the cup reached 100° C., and taken out of the oven. A heat resistance performance was evaluated from a change ratio of a filled capacity before/after a heat treatment, obtained by the following equation. It is to be noted that, in general, when the change ratio is 2% or less in this evaluation, the vessel is judged to have a satisfactory heat resistance.

Content change ratio (%)=[(internal volume before heat treatment)−(internal volume after heat treatment)]/(internal volume before heat treatment)×100

TABLE 1

| | | Example 1 | Example 2 | Example 3 | Example 4 | Example 5 | Example 6 | Example 7 | Comparative Example 1 |
|---|---|---|---|---|---|---|---|---|---|
| Forming conditions | Sheet | Polyester (SA135) sheet having a thickness of 1.2 mm | | | | | | | |
| | Silicone oil application | Present | Present | Absent | Present | Present | Present | Present | Present |
| | Pre-clamping step | Present | Absent | Present | Present | Present | Present | Present | Present |
| | Pre-forming step | Present | Present | Present | Present | Present | Present | Present | Absent |
| | Pre-forming | 23 | 15 | 23 | 5 | 45 | 31 | 5 | — |

TABLE 1-continued

|  |  | Example 1 | Example 2 | Example 3 | Example 4 | Example 5 | Example 6 | Example 7 | Comparative Example 1 |
|---|---|---|---|---|---|---|---|---|---|
|  | amount (mm) |  |  |  |  |  |  |  |  |
|  | H/D (vessel height/orifice inner diameter) | 1.6 | 1.6 | 1.6 | 1.3 | 2.1 | 1.6 | 1.6 | 1.6 |
| Evaluation results | Bottom part thickness (mm) | 0.28 | 0.28 | 0.28 | 0.28 | 0.23 | 0.34 | 0.12 | 0.10 |
|  | Bottom part area drawing magnification | 4.3 times | 4.3 times | 4.3 times | 4.3 times | 5.2 times | 3.5 times | 10 times | 12.6 times |
|  | Shaping property of bottom part | Satisfactory | Satisfactory | Satisfactory | Satisfactory | Satisfactory | Satisfactory | Satisfactory | Insufficient shaping |
|  | Transparency of bottom part | Satisfactory | Satisfactory | Satisfactory | Satisfactory | Satisfactory | Satisfactory | Satisfactory | Satisfactory |
|  | Warpage of flange | Satisfactory | Satisfactory | Satisfactory | Satisfactory | Satisfactory | Satisfactory | Satisfactory | Large warp |
|  | Appearance right under flange portion | Satisfactory | Satisfactory | Micro damages | Satisfactory | Satisfactory | Satisfactory | Satisfactory | Resin reservoir |
|  | Heat resistance performance (content change ratio) | 0.3% | 0.5% | 0.3% | 0.6% | 0.6% | 0.3% | 0.6% | 0.7% |

Example 2

A cup-shaped vessel was manufactured on the same conditions as those of Example 1 except that pre-clamping was not performed, and an insertion amount of a plug in first drawing was set to 15 mm. Evaluation was performed in the same manner as in Example 1, and results are shown in Table 1.

On the forming conditions, a satisfactory cup-shaped vessel was obtained in the same manner as in Example 1.

Example 3

A cup-shaped vessel was manufactured on the same conditions as those of Example 1 except that a portion corresponding to a flange portion was not coated with silicone oil. Evaluation was performed in the same manner as in Example 1, and results are shown in Table 1.

On the forming conditions, results were satisfactory except that micro damages such as scratches were seen on the side wall outer surface right under the flange portion.

Example 4

A cup-shaped vessel was manufactured on the same conditions as those of Example 1 except that a plug height was set to 90 mm, a lower mold dimension was adjusted in such a manner that a clearance between a plug and each portion was about 1 mm, H/D (vessel height/orifice portion inner diameter) was set to 1.3, and an insertion amount of the plug in first drawing was set to 5 mm. Evaluation was performed in the same manner as in Example 1, and results are shown in Table 1.

On the forming conditions, a satisfactory cup-shaped vessel was obtained in the same manner as in Example 1.

Example 5

A cup-shaped vessel was manufactured on the same conditions as those of Example 1 except that a plug height was set to 145 mm, a lower mold dimension was adjusted in such a manner that a clearance between a plug and each portion was about 1 mm, H/D was set to 2.1, an insertion amount of the plug in first drawing was set to 45 mm, and pre-clamp grasping surface inner diameter was set to 120 mm. Evaluation was performed in the same manner as in Example 1, and results are shown in Table 1.

On the forming conditions, a satisfactory cup-shaped vessel was obtained in the same manner as in Example 1.

Example 6

A cup-shaped vessel was manufactured on the same conditions as those of Example 1 except that an insertion amount of a plug in first drawing was set to 31 mm. Evaluation was performed in the same manner as in Example 1, and results are shown in Table 1.

On the forming conditions, a satisfactory cup-shaped vessel was obtained in the same manner as in Example 1.

Example 7

A cup-shaped vessel was manufactured on the same conditions as those of Example 1 except that an insertion amount of a plug in first drawing was set to 5.4 mm. Evaluation was performed in the same manner as in Example 1, and results are shown in Table 1.

On the forming conditions, a satisfactory cup-shaped vessel was obtained in the same manner as in Example 1.

Comparative Example 1

A cup-shaped vessel was manufactured on the same conditions as those of Example 1 except that a pre-forming step was omitted. It is to be noted that in this case there is not any effect of pre-clamping in that a resin is prevented from being taken among molds. The manufactured vessel was evaluated in the same manner as in Example 1, and results are shown in Table 1.

On the forming conditions, a flange portion warped upwards, and resin reservoir was generated inside a flange. A drawing magnification of a bottom part was high, and thickness was reduced.

INDUSTRIAL APPLICABILITY

According to the present invention, there can be provided a method for manufacturing a thermoplastic resin vessel in which thickening of a vessel bottom part and warpage of a flange portion are improved.

The invention claimed is:

1. A method for manufacturing a thermoplastic resin vessel, comprising the sequential steps of:
   1) fixing an outer periphery of a portion to be formed to a cup-shaped vessel of a thermoplastic resin sheet by pre-clamped molds;
   2) pre-forming an inner portion of the fixed portion of the thermoplastic resin sheet by a plug, wherein a portion corresponding to an orifice portion or a flange portion of the cup-shaped vessel is drawn;
   3) clamping the portion corresponding to the orifice portion or the flange portion of the cup-shaped vessel further by an upper mold and a lower mold;
   4) drawing an inner portion of the clamped portion further by the plug;
   5) pneumatically forming the drawn portion into a shape of the lower mold heated at not less than a crystallization temperature of the thermoplastic resin sheet, and thermally fixing the sheet; and
   6) decompressing an inside of the formed article to contract the formed article into a shape of the plug which is a final vessel shape, and cooling the article.

2. The method for manufacturing the thermoplastic resin vessel according to claim 1, wherein the clamping step comprises the steps of: extruding a part of a resin in the portion corresponding to the flange portion inner and outer peripheral directions; and forming the flange portion.

3. The method for manufacturing the thermoplastic resin vessel according to claim 1, wherein the thermoplastic resin sheet is formed of at least a thermoplastic polyester resin.

* * * * *